United States Patent
Petrie et al.

(10) Patent No.: US 8,524,386 B2
(45) Date of Patent: Sep. 3, 2013

(54) PORTABLE PNEUMATIC CONTROLLER WITH REPLACEABLE BATTERY

(75) Inventors: Aidan Petrie, Jamestown, RI (US);
Daniel J. Nelsen, Warwick, RI (US);
Marco Wo, Providence, RI (US)

(73) Assignee: Covidien LP, Mansfield, MA (US)

( * ) Notice: Subject to any disclaimer, the term of this patent is extended or adjusted under 35 U.S.C. 154(b) by 343 days.

(21) Appl. No.: 12/894,805

(22) Filed: Sep. 30, 2010

(65) Prior Publication Data

US 2012/0082879 A1    Apr. 5, 2012

(51) Int. Cl.
*H01M 2/10* (2006.01)

(52) U.S. Cl.
USPC ............... 429/100; 429/96; 429/99; 429/163; 429/176

(58) Field of Classification Search
USPC ................. 429/9, 96–100, 163–187
See application file for complete search history.

(56) References Cited

U.S. PATENT DOCUMENTS

| | | | |
|---|---|---|---|
| 3,279,953 A | 10/1966 | Bierdumpfel | |
| 3,852,117 A | 12/1974 | Fraioli | |
| 4,625,174 A * | 11/1986 | Eberhart | 324/426 |
| 4,702,975 A * | 10/1987 | Fields | 429/100 |
| 5,194,340 A | 3/1993 | Kosako | |
| 5,571,632 A * | 11/1996 | Teramoto | 429/94 |
| 5,654,111 A * | 8/1997 | Minomiya et al. | 429/162 |
| 5,998,060 A | 12/1999 | McGrady | |
| D457,131 S | 5/2002 | Kitoh et al. | |
| 7,354,410 B2 | 4/2008 | Perry et al. | |
| 2003/0134192 A1 | 7/2003 | Katsumoto et al. | |
| 2005/0008931 A1 | 1/2005 | Axelrod | |
| 2005/0107725 A1* | 5/2005 | Wild et al. | 601/152 |
| 2007/0088385 A1 | 4/2007 | Perry | |
| 2008/0262399 A1 | 10/2008 | Kovelman et al. | |

\* cited by examiner

*Primary Examiner* — Raymond Alejandro
*Assistant Examiner* — Jimmy K Vo
(74) *Attorney, Agent, or Firm* — John Paul Mello, Esq.

(57) ABSTRACT

A pneumatic controller assembly including a controller having a housing and an air pump in the housing. The housing has a recess and an annular input terminal in the recess. A battery for powering the air pump has a central axis and an annular output terminal extending around the central axis. The battery is adapted for receipt in the recess of the controller in a multiplicity of orientations of the battery about its central axis. The output terminal of the battery is shaped and positioned to make electrical contact with the input terminal of the controller to energize the controller without regard to the orientation of the battery about its central axis.

12 Claims, 6 Drawing Sheets

PORTABLE PNEUMATIC CONTROLLER WITH REPLACEABLE BATTERY

FIELD OF THE INVENTION

The present invention generally relates to a portable pneumatic controller having a replaceable battery, and more particularly to a controller for a sequential compression device having a replaceable battery.

BACKGROUND OF THE INVENTION

A portable pneumatic controller requires a source of power that is also portable. Batteries are an excellent portable source of power, but must be replaced from time to time. Typically, inserting a battery into a controller requires a specific orientation of the battery to properly insert the battery into the controller so that the respective contacts properly align. This process can be difficult during clinical practice when a clinician is often required to perform multiple tasks at once. Thus, there exists a need for a controller and battery configuration that facilitates easy connection between the two components with minimal effort by the clinician.

SUMMARY OF THE INVENTION

In one aspect of the present invention, a pneumatic controller assembly generally comprises a controller having a housing and an air pump in the housing. The housing has a recess and an annular input terminal in the recess. A cylindrical battery for powering the air pump has a central axis and an annular output terminal extending around the central axis. The battery is adapted to be received in the recess of the controller in a multiplicity of orientations of the battery about its central axis. The output terminal of the battery is shaped and positioned to make electrical contact with the input terminal of the controller to energize the controller without regard to the orientation of the battery about its central axis.

In another aspect of the invention, a medical device controller system generally comprises a controller programmed to perform at least one operation of a medical device. The controller has a recess and an annular input terminal in the recess. A cylindrical battery for powering the controller has an annular output terminal. The battery is adapted to be received in the recess of the controller in a multiplicity of orientation of the battery about its central axis. The output terminal of the battery is shaped and positioned to make electrical contact with the input terminal of the controller to energize the controller.

Other objects and features will be in part apparent and in part pointed out hereinafter.

BRIEF DESCRIPTION OF THE DRAWINGS

Corresponding reference characters indicate corresponding parts throughout the drawings.

DESCRIPTION OF THE PREFERRED EMBODIMENTS

Figure 5:
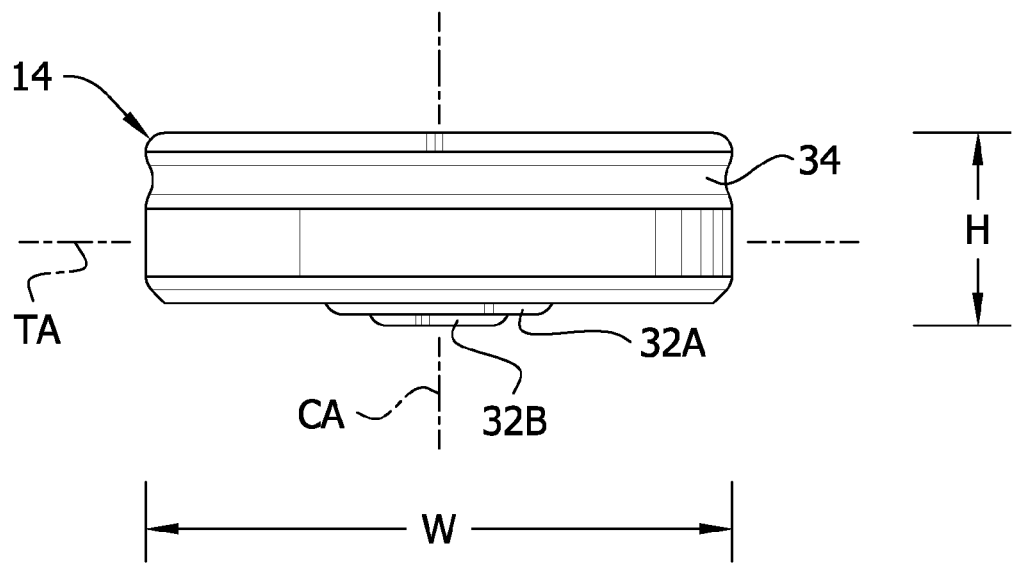
FIG. 5 is a side view of the battery.
Figure 6:
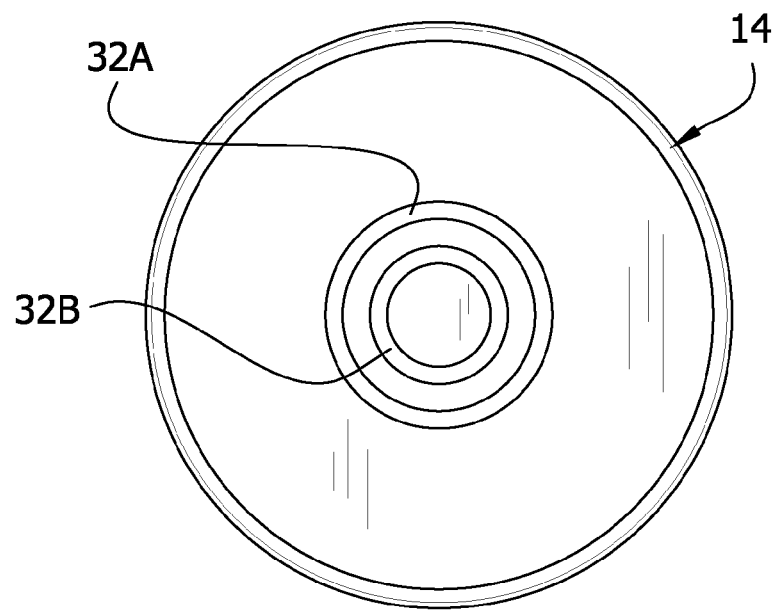
FIG. 6 is a bottom view of the battery.
Figure 7:
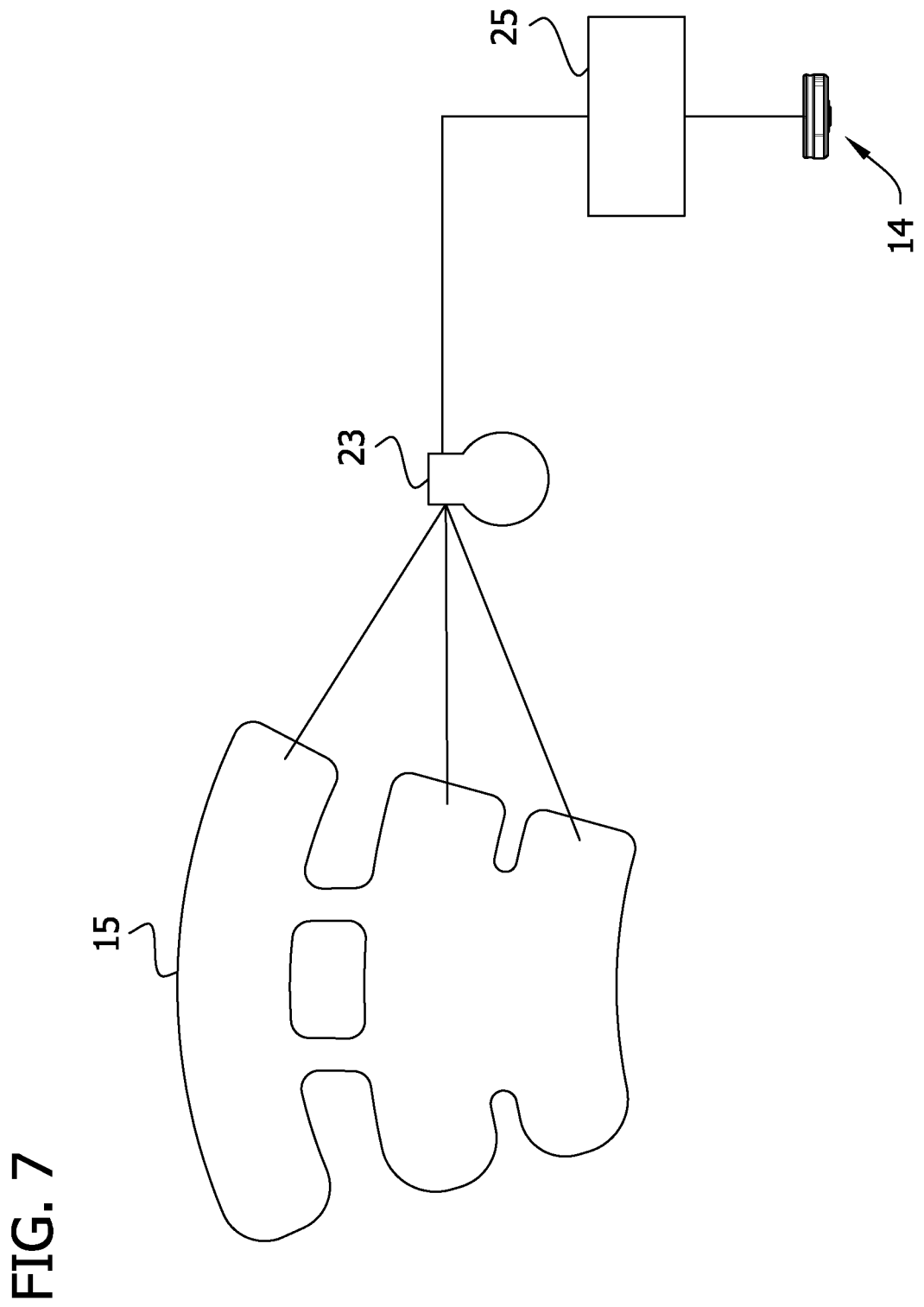
FIG. 7 is a schematic of the controller system.

Referring to the drawings, FIGS. 1-7 illustrate an embodiment of a controller system 10 for controlling a medical device (not shown) such as a compression sleeve. The controller system 10 comprises a portable pneumatic controller 12 and a replaceable battery 14 for powering the controller. The controller 12 is configured for communication with the medical device and programmed to perform at least one operation of the medical device. In the instance where the medical device is a compression sleeve 15, the operation could be a sequential compression pattern of the compression sleeve. The portable controller 12 includes an air pump 23, and is configured to be worn by a patient along with the compression sleeve 15 (FIG. 7). For example, the controller 12 may be mounted on the compression sleeve 15. It is understood that other medical devices and other operations can be used without departing from the present invention.

Referring to FIGS. 1-4, the controller 12 communicates with the medical device through tubes 16. The controller 12 comprises a housing 18 having a top 20, a bottom 22 and an annular recess 24 in the top of the housing. The housing 18 may contain the air pump 23 and suitable circuitry 25 (FIG. 7). The circuitry may control power for the pump, valves (not shown) and operation for sequential inflating and deflating bladders in the compression sleeve 15. The recess 24 forms a rim 26 in the top 20 of the body 18. A pair of opposing cutouts 28 are formed in the rim 26 of the recess 24. A pair of contacts 30A, 30B (broadly, "input terminals") in the recess 24 are provided to electrically connect the battery 14 to the controller 12 when the battery is received in the recess 24.

Referring to FIGS. 5 and 6, the battery 14 comprises an annular member having a transverse axis TA extending diametrically of the battery and a central axis CA extending through the axis of rotation of the battery. Contacts 32A, 32B (broadly, "output terminals") are concentrically disposed on a bottom of the battery 14 and are configured to engage the (positive and negative) contacts 30A, 30B in the recess 24 of the controller 12 to electrically connect the battery to the controller for powering the controller. A side of the battery 14 has an circumferential indentation 34 for gripping the battery. The battery 14 also has a low profile defined by a width W of the battery being greater than a height H.

Figure 1:
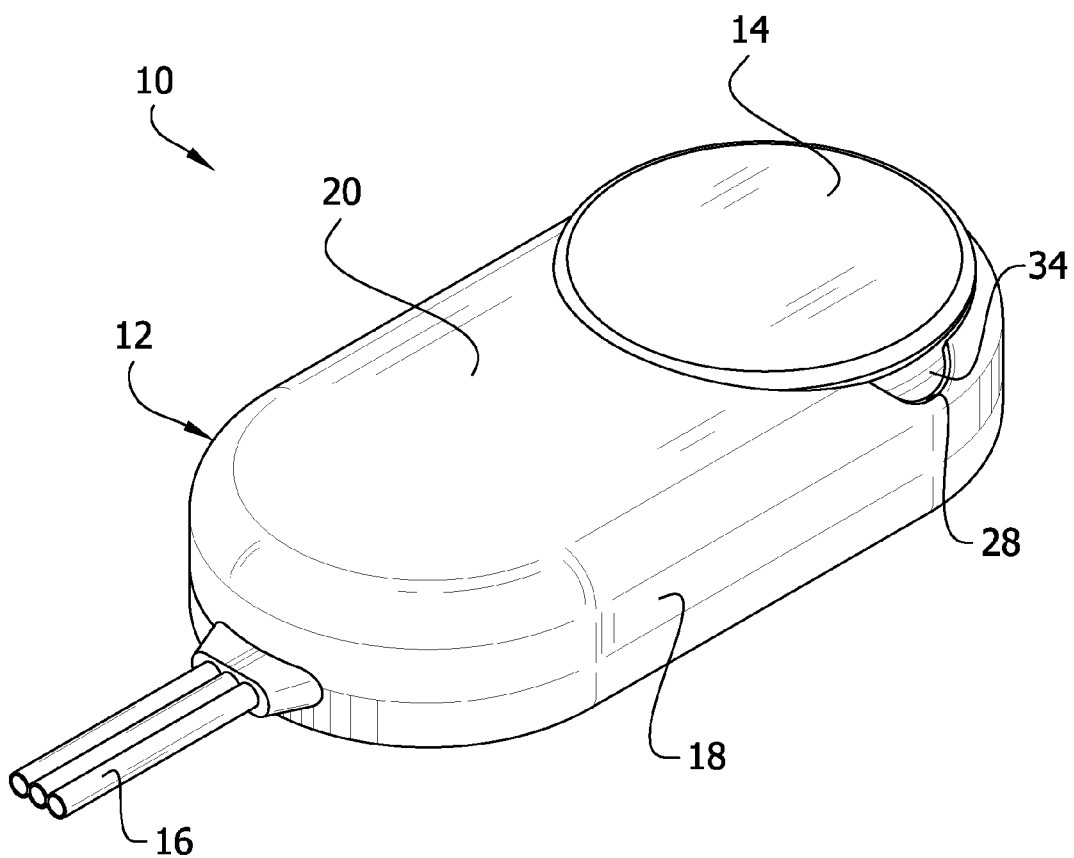
FIG. 1 is a perspective of a portable pneumatic controller system and battery thereof.
Figure 2:
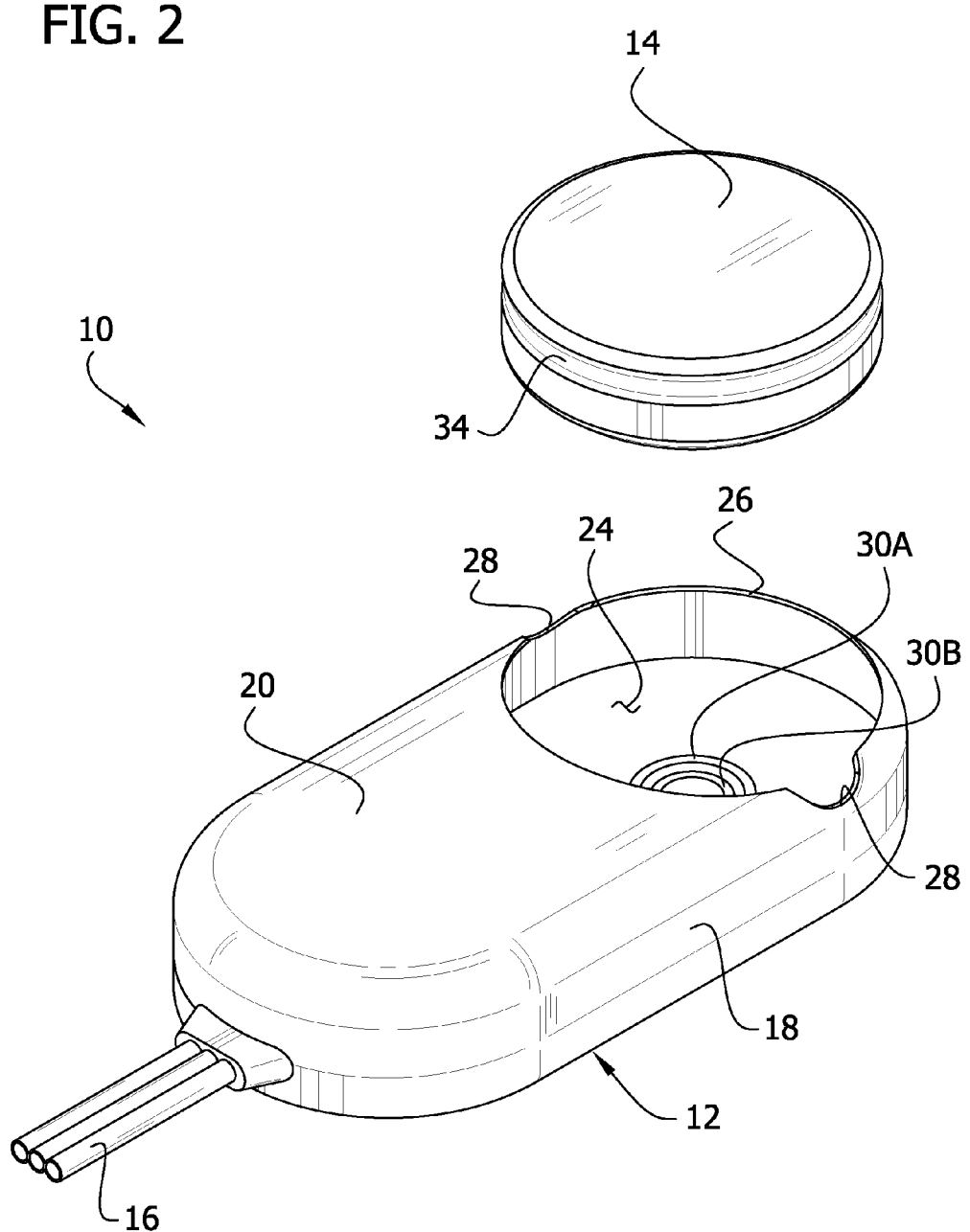
FIG. 2 is a perspective of the controller system with the battery exploded therefrom.
Figure 3:
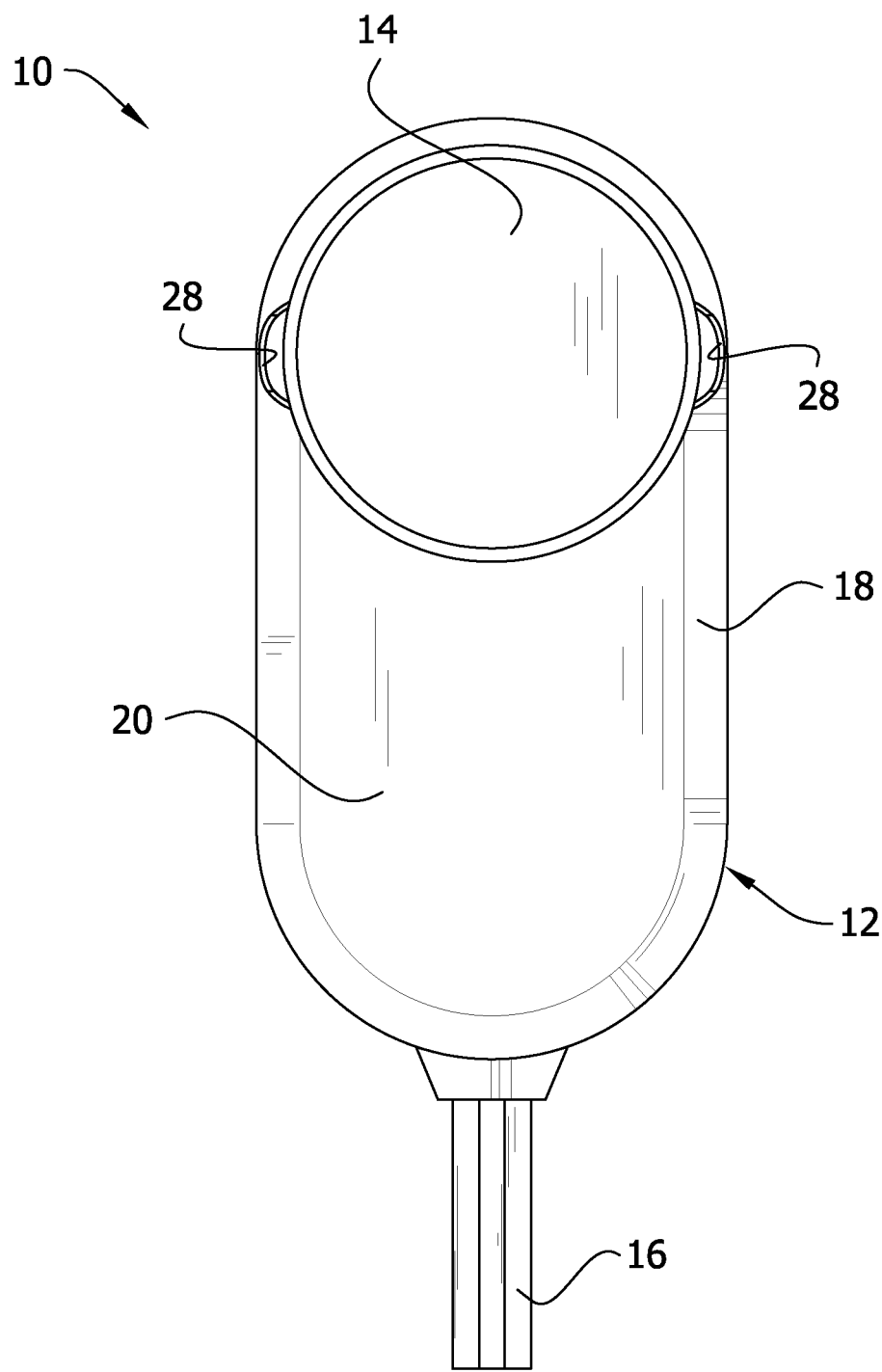
FIG. 3 is a top view of the controller system.
Figure 4:
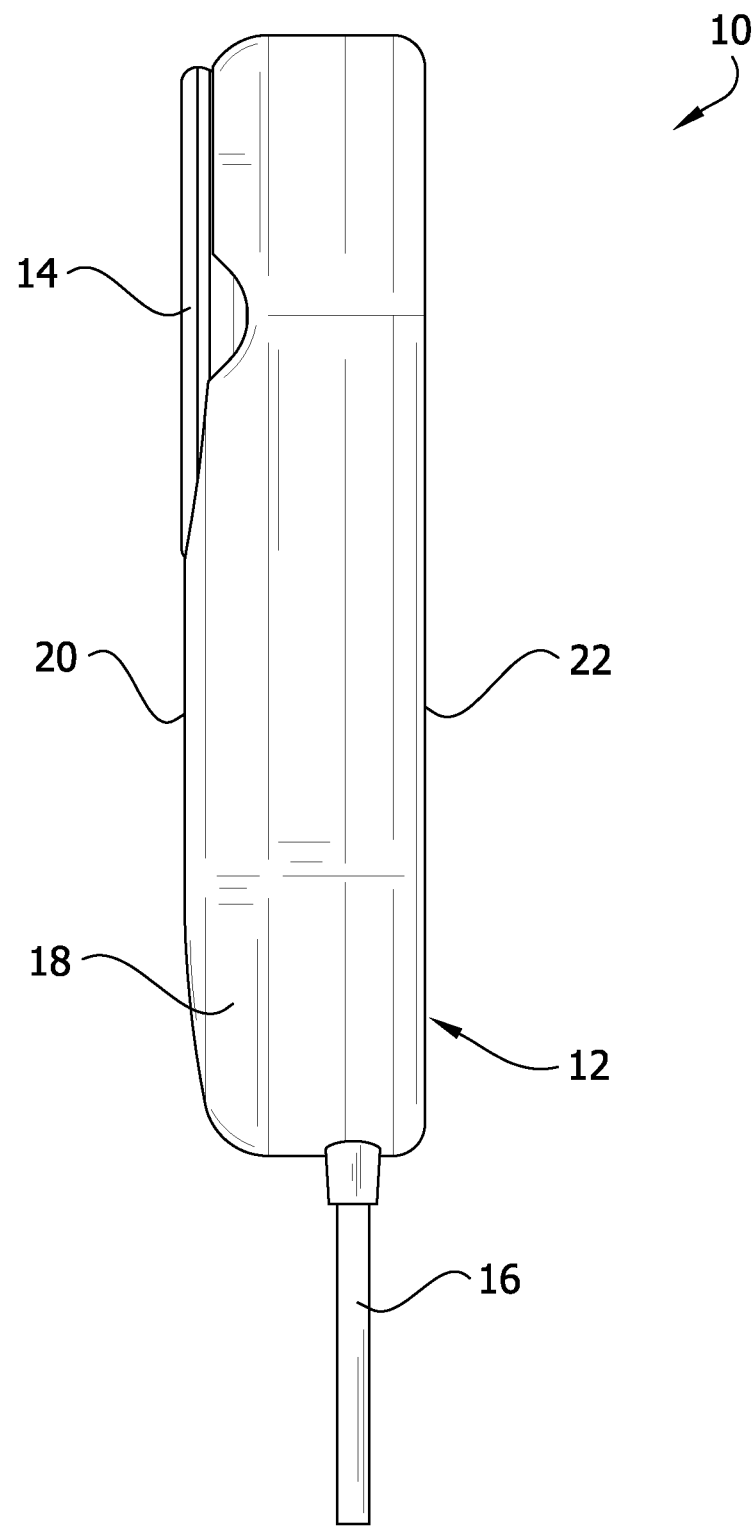
FIG. 4 is a side view of the controller system.

The battery 14 is sized and shaped for receipt in the recess 24 in the controller 12. The battery 14 is held in the recess 24 by a friction fit. The height H of the battery 14 is such that a top of the battery extends only slightly above the top 20 of the controller 12 (FIG. 4), but is nearly flush. The circumferential indentation 34 is accessible through the cutouts 28 in the controller 12 (FIG. 1). Removal of the battery 14 is performed by grasping the circumferential indentation 34 in the battery through the cutouts 28.

The configuration of the controller 12 and battery 14 facilitates easy insertion of the battery into the recess 24. The annular configuration of the contacts 30A, 30B and 32A, 32B permit electrical connection to be made without any regard to the orientation of the battery 14 about its central axis CA. It will be understood that only one of the controller contacts 30A, 30B and battery contacts 32A, 32B need be annular in the present invention. In practice, this substantially reduces the likelihood that the battery 14 will be improperly attached to the controller 12. The technician can simply push the battery 14 into the recess 24, contacts 32A, 32B facing into the recess, and electrical connection is made. The angular orientation of the battery 14 within the recess 24 is irrelevant as the positive and negative contacts 32A, 32B of the battery will always contact the corresponding positive and negative contacts 30A, 30B of the controller 12. The controller system 10 may in one embodiment be provided with multiple batteries 14 that can be recharged so that an exhausted battery may be quickly and easily replaced with a freshly charged battery.

Having described the invention in detail, it will be apparent that modifications and variations are possible without departing from the scope of the invention defined in the appended claims.

When introducing elements of the present invention or the preferred embodiments(s) thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the invention are achieved and other advantageous results attained.

As various changes could be made in the above constructions without departing from the scope of the invention, it is intended that all matter contained in the above description and shown in the accompanying drawings shall be interpreted as illustrative and not in a limiting sense.

What is claimed is:

1. A pneumatic controller assembly comprising:
    a controller including a housing and an air pump in the housing, the housing having a recess and an annular input terminal in the recess; and
    a cylindrical battery for powering the air pump having a central axis and an annular output terminal comprising a positive annular contact and a negative annular contact extending around the central axis, the battery being adapted to be received in the recess of the controller in a multiplicity of orientations of the battery about its central axis, the output terminal of the battery being shaped and positioned to make electrical contact with the input terminal of the controller to energize the controller without regard to the orientation of the battery about its central axis, wherein the recess defines an annular rim extending around the circumference of the battery when received in the recess, the controller housing including a pair of opposing cutouts in the rim adjacent the recess to facilitate removal of the battery from the recess, wherein the battery has a circumferential indentation in a side of the battery to facilitate gripping the battery, and wherein the battery is held in the recess by friction fit when received in the recess and the circumferential indentation is at least partially exposed through the cutouts in the rim to selectively remove the battery from the recess.

2. A controller assembly as set forth in claim 1 wherein the positive and negative annular contacts are concentric with each other.

3. A controller assembly as set forth in claim 2 wherein the input terminal of the controller comprises a positive annular contact and a negative annular contact.

4. A controller assembly as set forth in claim 1 wherein the input terminal of the controller comprises a positive annular contact and a negative annular contact.

5. A controller assembly as set forth in claim 4 wherein the positive and negative annular contacts of the input terminal are concentric with each other.

6. A controller assembly as set forth in claim 1 wherein the battery has a low profile defined by a width of the battery being greater than a height of the battery.

7. A medical device controller system comprising:
    a controller programmed to perform at least one operation of a medical device, the controller having a housing, a recess and an annular input terminal in the recess; and
    a cylindrical battery for powering the controller having an annular output terminal comprising a positive annular contact and a negative annular contact, the battery being adapted to be received in the recess of the controller in a multiplicity of orientations of the battery about its central axis, the output terminal of the battery being shaped and positioned to make electrical contact with the input terminal of the controller to energize the controller, wherein the recess defines an annular rim extending around the circumference of the battery when received in the recess, the controller housing including a pair of opposing cutouts in the rim at the recess to facilitate removal of the battery from the recess, wherein the battery has a circumferential indentation in a side of the battery to facilitate gripping the battery, and wherein the battery is held in the recess by friction fit when received in the recess and the circumferential indentation is at least partially exposed through the cutouts in the rim to selectively remove the battery from the recess.

8. A system as set forth in claim 7 wherein the positive and negative annular contacts are concentric with each other.

9. A system as set forth in claim 8 wherein the input terminal of the controller comprises a positive annular contact and a negative annular contact.

10. A system as set forth in claim 7 wherein the input terminal of the controller comprises a positive annular contact and a negative annular contact.

11. A system as set forth in claim 10 wherein the positive and negative annular contacts of the input terminal are concentric with each other.

12. A system as set forth in claim 7 wherein the battery has a low profile defined by a width of the battery being greater than a height of the battery.

* * * * *